United States Patent [19]

Coe et al.

[11] Patent Number: 5,271,222
[45] Date of Patent: Dec. 21, 1993

[54] JET PROPULSION POWERPLANTS

[75] Inventors: Ronald Coe; Douglas F. Kerr, both of Preston, United Kingdom

[73] Assignee: British Aerospace Public Limited Company, London, England

[21] Appl. No.: 702,407

[22] Filed: Dec. 20, 1984

[30] Foreign Application Priority Data

Dec. 20, 1983 [GB] United Kingdom ................ 8333926
Nov. 14, 1984 [GB] United Kingdom ................ 8428822

[51] Int. Cl.⁵ .............................................. F02K 1/00
[52] U.S. Cl. ...................................... 60/229; 60/230; 60/262; 60/60; 60/39.01
[58] Field of Search ............. 60/230, 229, 39.01, 60/262; 244/23 D, 12.5, 12.4, 23 B, 53 B, 53 R, 125, 130, 12.3, 135 B, 100 R, 100 D

[56] References Cited

U.S. PATENT DOCUMENTS

| | | | |
|---|---|---|---|
| 3,837,411 | 9/1974 | Nash | 60/229 |
| 4,038,818 | 8/1977 | Snell | 60/226.3 |
| 4,533,095 | 8/1985 | Yates | 244/12.5 |

Primary Examiner—Donald P. Walsh
Attorney, Agent, or Firm—Cushman, Darby & Cushman

[57] ABSTRACT

A flow diverter arrangement for an aircraft comprises a first duct 17 for receiving propulsion fluid from the powerplant 11 and delivering it to a first location 18, a second duct 19 merging with the first duct 17 at a communication aperture 23 and adapted to deliver propulsion fluid to a second location, a flap member 24 pivoted for movement between a first position in which it closes the communication aperture 23 and a second position in which it closes the first duct, and a diverter device 31 for diverting propulsion fluid into the second duct when the flap member is in its second position.

5 Claims, 3 Drawing Sheets

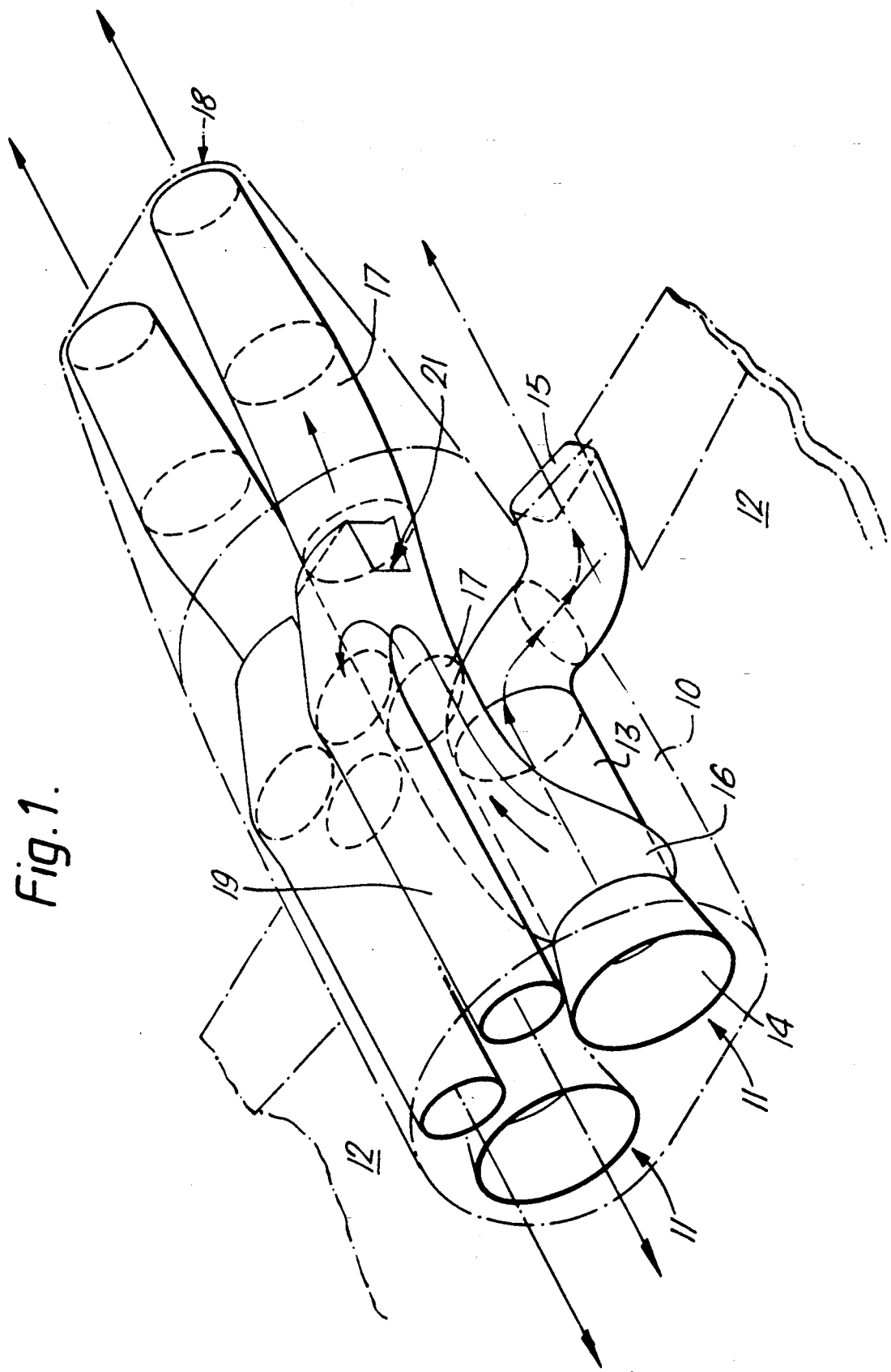

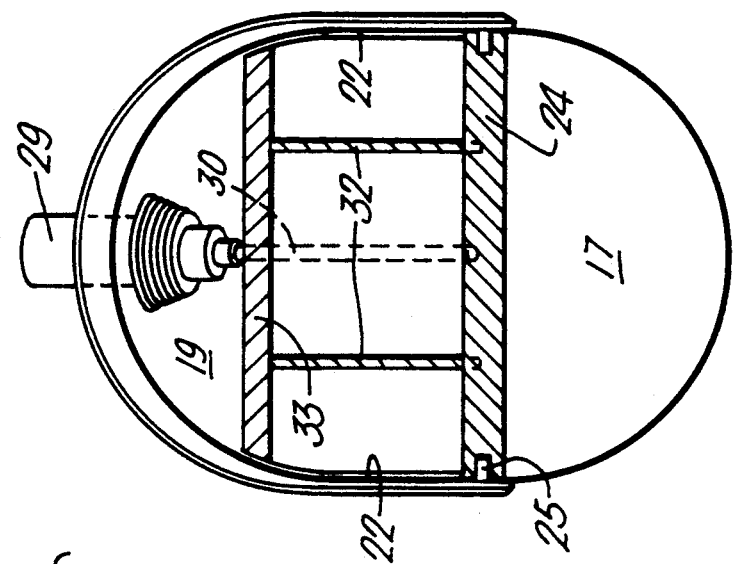
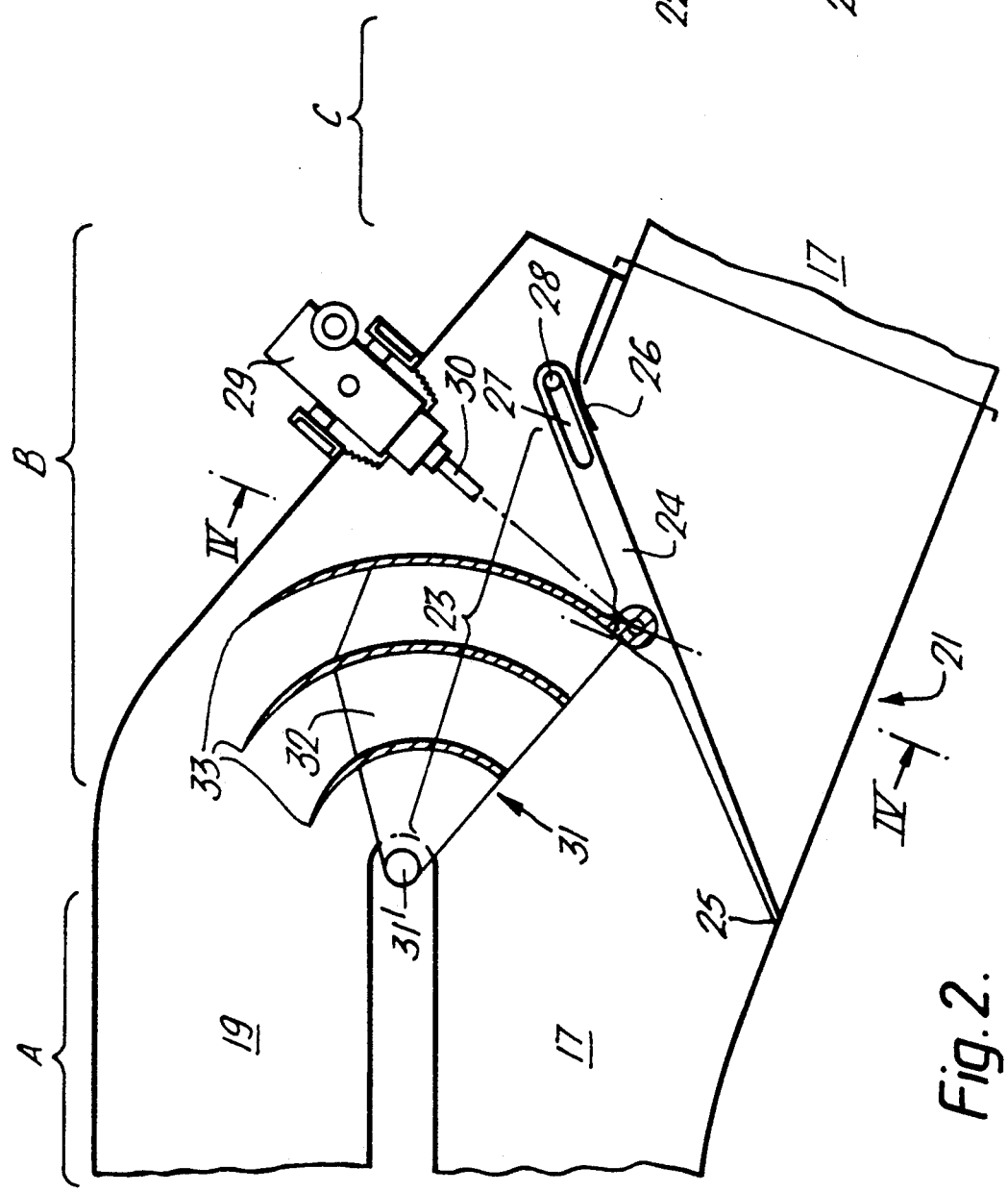

JET PROPULSION POWERPLANTS

This invention relates to jet propulsion powerplants and in particular though not exclusively, to flow diverter arrangements therefor.

According to one aspect of this invention, there is provided a flow diverter arrangement for a jet propulsion powerplant, which arrangement includes:

(i) first duct means for receiving at least a portion of the propulsion fluid from said powerplant and delivering it to a first location, (ii) second duct means for delivering at least a portion of said propulsion fluid to a second location and being in flow communication with said first duct means via a communication aperture, (iii) flap means mounted adjacent a downstream portion of said aperture for pivotal movement between a first position in which it closes said aperture and a second position in which it closes said first duct means, (iv) diverter means mounted adjacent an upstream region of the aperture for pivotal movement between a stowed position in which it is located in said second duct means and a deployed position in which it protrudes into said first duct means thereby to deflect propulsion fluid passing along said first duct means towards and into said second duct means, and (v) coupling means operatively coupling said flap means and said diverter means and adapted so that when said flap means moves from its first position to its second position, the diverter means is caused to move from its stowed position to its deployed position.

According to another aspect of this invention, there is provided an aircraft of the vertical and/or short take-off type which includes:

(i) a body portion;

(ii) jet propulsion powerplant means housed within said body portion and having fan means arranged upstream thereof;

(iii) first outlet means for exhausting the hot core efflux generated by said powerplant means and being movable between a position in which it directs efflux rearwardly for forward propulsion purposes and a position in which it directs efflux downwardly for lift purposes;

(iv) by-pass duct means extending rearwards for receiving fan efflux and for delivering it to second outlet means arranged to exhaust the fan efflux rearwardly;

(v) a flow diverter arrangement associated with said by-pass duct means and operable to divert at least a portion of the fan efflux into further generally forwardly extending duct means, and (vi) third outlet means disposed forwardly of said fan and adapted to receiving fan efflux from said further duct means and to exhaust it generally downwardly.

Further aspects will be apparent from the following description, which is by way of example only, in which reference will be made to the accompanying drawings, in which:

FIG. 1 is a schematic perspective view of the aft part of an aircraft having a pair of jet propulsion powerplants;

FIG. 2 is a side section through the diverter arrangement associated with the by-pass duct of one of the powerplants;

Figure 3:
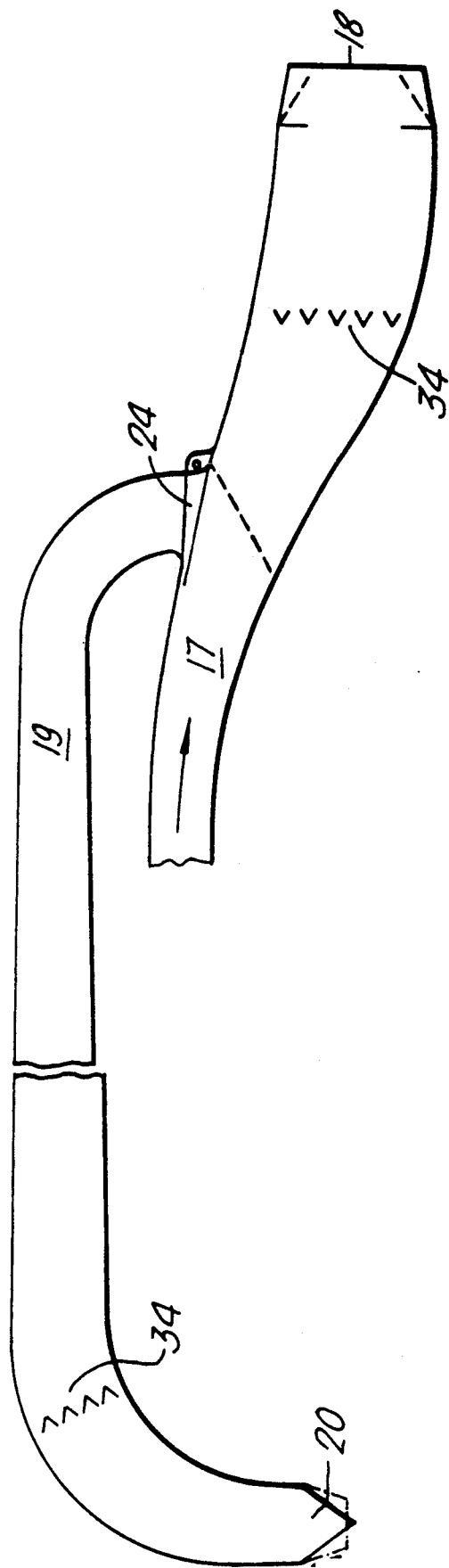
FIG. 3 is a schematic view showing the by-pass flow system of one of the powerplants, and, FIG. 4 is a section view on lines IV—IV of the arrangement illustrated in FIG. 2.

Referring initially to FIG. 1, the aircraft includes a fuselage portion 10 in which is housed a pair of jet propulsion powerplants 11 in side by side relationship; two wing portions 12 extend from either side of the fuselage. Each powerplant comprises a core engine 13 which drives a fan 14 disposed forwardly of the engine 13. The hot core efflux exhausts through a core efflux nozzle 15 disposed to one side of the fuselage and rotatable between a position in which it directs efflux rearwardly and a position in which it directs efflux downwardly. The efflux from the fan 14 is collected by a muff arrangement 16 to pass into a first by-pass duct 17 which delivers the efflux to a rearwardly directed fan efflux nozzle 18. A second duct 19 merges with the first by-pass duct rearwardly of the muff 16 and extends forwardly of the fan to terminate in a downwardly directed fan efflux nozzle 20 (FIG. 4). At the mergence of the ducts 17 and 19 there is provided a diverter arrangement 21 to be described in detail below with reference to FIG. 2. The diverter arrangement 21 is operable to cause fan efflux passing through first by-pass duct 17 either to continue to rearwardly directed fan efflux nozzle 18, or to downwardly directed fan efflux nozzle 20, or to apportion the by-pass flow between the nozzles 18 and 20 in a desired manner.

Referring now to FIGS. 2 to 4, the diverter arrangement 21 includes a forward portion A, an intermediate portion B, and a rearward portion C. In the forward portion A, the first by-pass duct 17 and the second duct 19 are each of generally elliptical section and they merge together in the intermediate portion B to define a single flattened elliptical section having opposed generally planar side regions 22, and the lower region of the elliptical section changes to a circular cross-section to form the continuation of first by-pass duct 17 in the rearward portion C of the diverter arrangement. Forwardly of the diverter arrangement the second duct 19 changes to a circular section. Between the first by-pass duct 17 and the second duct 19 is defined a communication aperture 23 of a flattened D-shape.

The diverter arrangement comprises a flap member 24 having a peripheral sealing strip 25 and shaped to match the shape of the communication aperture 23. The flap member includes at one end a slot 27 by which it is mounted on roller guides 28 secured to the walls of the duct for pivotal and translational movement between an open position and a closed position. A further sealing strip 26 is secured to the walls of the duct and bears on the flap element adjacent to slot 27 to prevent leakage of propulsion fluid. In the open position the flap member sealingly closes communication aperture 23 and propulsion fluid passing along the forward part of first by-pass duct 17 is allowed to continue along the length thereof to rearwardly directed fan efflux nozzle 13. In the closed position the flap member opens the communications aperture but sealingly closes the downstream part of first by-pass duct (FIG. 2). Naturally, the communications aperture 23, the flap member 24, and the lower part of the intermediate portion B are each shaped to enable the flap member selectively to close communications aperture 23 and the downstream part of first by-pass duct 17.

Movement of the flap member is achieved by means of a ball-screw actuator 29 pivotally mounted on an upper part of the second duct 19, the actuating rod 30 passing into second duct 19 and being pivotally coupled to a mid-portion of the flap member 24.

A vane diverter assembly 31 is pivotally mounted at 31 at a location forward of, but adjacent communication aperture 23, and comprises a pair of parallel spaced support plates 32 which carry three curved vane elements 33. The support plates 32 are pivotally attached to the flap member 24 coaxially with its pivotal coupling with the actuating rod 30 of the actuator. By this arrangement, when the flap member 24 is in its closed position, the vane diverter assembly is stowed in the rearward portion of second duct 19, but when the flap member is moved towards its closed position, the vane assembly is drawn into a deployed position where it protrudes into the first by-pass duct 17 to divert fan efflux towards and into the second duct 19.

The first and second by-pass ducts 17,19 each include a reheat type of gutter 34 for introducing unburnt fuel into the airflow thereby to enhance the thrust produced at the respective efflux nozzles 18 and 20. Efflux nozzles 18 and 20 are each adjustable to vary the effective aperture area thereof and furthermore nozzle 20 is adjustable to vary the downward direction in which fluid is exhausted.

Although only one powerplant 10 has been described, the other powerplant is of the same form as that described. However, it will be appreciated that the invention does extend to those arrangements employing a single powerplant.

By way of example, three modes of operation of the aircraft set forth above will now be described.

Forward Cruise

The core efflux nozzles 15 are directed rearwardly and the flap member 24 is in its open position so that all the fan efflux collected by muff 16 is exhausted rearwardly by rearwardly directed fan efflux nozzle 18. The thrust developed by fan efflux nozzle 18 can be enhanced by activation of the reheat gutter 34 in duct 17.

Vertical Take-Off

The core efflux nozzles 15 are directed downwardly and the flap member 24 is in its closed position so that all the fan efflux collected by muff 16 is exhausted downwardly by downwardly directed fan efflux nozzle 20. For vertical landing, the flap member may be opened slightly to control the amount of fan efflux supplied to nozzle 20, and the reheat gutter 34 in second duct 19 can be activated to increase the vertical thrust developed at 20.

Short Take-Off

The core efflux nozzles 15 are dircted to an intermediate setting and the flap member also is in an intermediate setting so that the fan efflux collected by muff 16 is apportioned in a desired relationship between downwardly directed fan efflux nozzle 20 and rearwardly directed fan efflux nozzle 18. Reheat gutter 34 in duct 17 is activated to increase the thrust generated at fan efflux nozzle 18.

We claim:

1. A flow diverter arrangement for a jet propulsion powerplant, which arrangement includes:
   (i) first duct means for receiving at least a portion of the propulsion fluid from said powerplant and delivering it to a first location,
   (ii) second duct means for delivering at least a portion of said propulsion fluid to a second location and being in flow communication with said first duct means via a communication aperture,
   (iii) flap means mounted adjacent a downstream portion of said aperture for pivotal movement between a first position in which it closes said aperture and a second position in which it closes said first duct means,
   (iv) diverter means mounted adjacent an upstream region of the aperture for pivotal movement between a stowed position in which it is located in said second duct means and a deployed position in which it protrudes into said first duct means thereby todeflect.propulsion fluid passing along said first duct means towards and into said second duct means, and
   (v) coupling means operatively coupling said flap means and said diverter means and adapted so that when said flap means moves from its first position to its second position, the diverter means is caused to move from its stowed position to its deployed position.

2. An arrangement as claimed in claim 1, wherein said second duct means extends in generally side by side manner with respect to said first duct means.

3. An arrangement as claimed in claim 1 wherein said diverter means comprise a series of vane elements secured to a support member which is pivotally mounted adjacent said upstream region of said communication aperture.

4. An aircraft according to claim 1 wherein means are provided to introduce unburnt fuel into said further duct means intermediate said second location means and said flow diverter arrangement, said means being operable to enhance the thrust generated at said second location means.

5. An aircraft according to claim 1 wherein said second location means are operable to vary the direction in which said efflux is exhausted.

* * * * *